No. 750,429. PATENTED JAN. 26, 1904.
F. BRAUN.
WIRELESS ELECTRIC TRANSMISSION OF SIGNALS OVER SURFACES.
APPLICATION FILED FEB. 6, 1899.
NO MODEL. 2 SHEETS—SHEET 1.

Inventor
Ferdinand Braun
By Philipp Phelps Sawyer
Attys

Attest
T. F. Kehoe

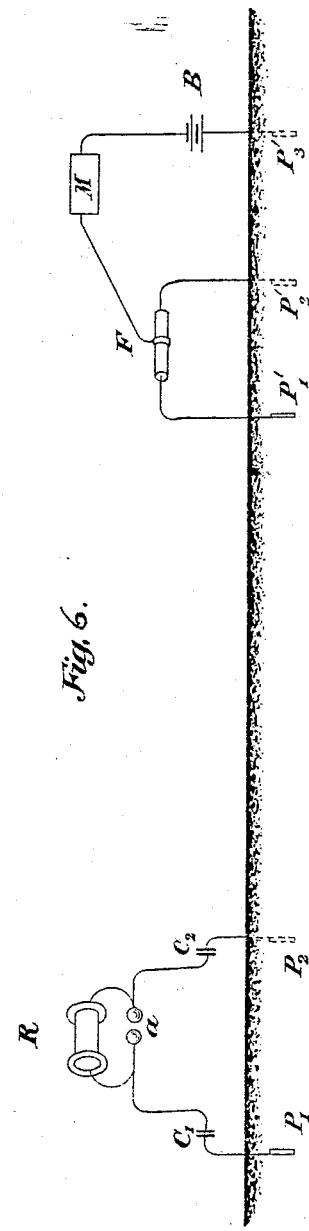

No. 750,429. Patented January 26, 1904.

UNITED STATES PATENT OFFICE.

FERDINAND BRAUN, OF STRASSBURG, GERMANY.

WIRELESS ELECTRIC TRANSMISSION OF SIGNALS OVER SURFACES.

SPECIFICATION forming part of Letters Patent No. 750,429, dated January 26, 1904.

Application filed February 6, 1899. Serial No. 704,604. (No model.)

*To all whom it may concern:*

Be it known that I, FERDINAND BRAUN, a subject of the German Emperor, and a resident of Strassburg, Alsace, German Empire, have invented a new and useful Wireless Electric Transmission of Signals Over Surfaces, of which the following is a specification.

My invention relates to the transmission of electric signals without connecting-wires.

The accompanying drawings illustrate diagrammatically preferred apparatus for carrying out the invention.

Figure 1:
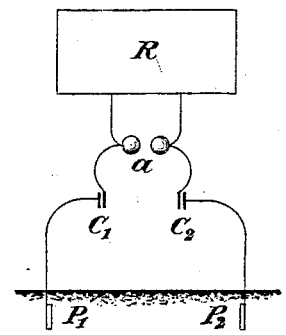
Figure 2:
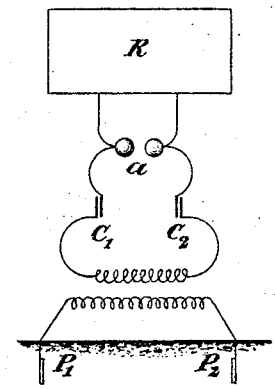
Figure 3:
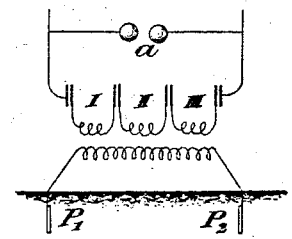
Figure 4:
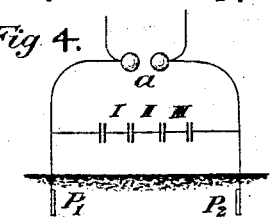
Figure 5:
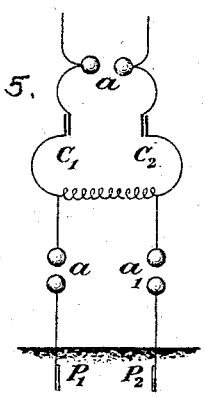

Figure 1 shows a form of the transmitting apparatus. Fig. 2 shows an apparatus having induction-coils forming a transformer. Figs. 3, 4, and 5 show modifications hereinafter explained, and Fig. 6 shows the general arrangement of the electrical connections of the transmitting and receiving apparatus.

Hitherto the transmission of electric signals as above mentioned, usually termed "wireless telegraphy," has been based on the propagation of electric waves in space, and various difficulties have been encountered which have prevented such methods being satisfactory. According to my invention I avoid these difficulties by utilizing the surfaces of conducting-bodies as a medium for the transmission of the electric waves.

My invention is based on the fact, now well known to electricians, that when alternating currents of high frequency are supplied to cylindrical conductors the outer surface of the conductor is the important factor in transmitting the energy, and the inner portions of the conductor are of very little use. This fact, which is true for conducting bodies, is also true for semiconductors, such as water and earth, as experiments on a large scale have conclusively shown.

According to my invention I take advantage of the tendency above mentioned for electric-current waves to press toward the outer surface of a conductor or semiconductor by applying to two plates buried in the earth at a short distance apart an alternating current of very high intensity and frequency. The lines of flow of the current from one plate to the other will no longer take the shortest path, but will pass from their sources in large arcs covering a considerable area. Within this area the current vibrations may be collected and utilized to give signals by devices of any suitable description. The application of the alternating current to the earth-plates can be arranged in various ways—for example, currents of high frequency may be created in a complete system by means of condensers, for instance, and these currents can be then supplied to the wires which lead to the earth-plates, or by means of rotary machines a very high frequency may be forcibly obtained which is independent of the self-induction and capacity of the earth-plates. With these details my present invention is not particularly concerned, as various methods of supply may be adopted. In order, however, that my invention may be clearly understood, I have shown in the accompanying diagrams various arrangements for supplying current to the earth-plates.

In Figs. 1 and 2, R represents a Ruhmkorff's induction-coil or a Holz's influence-machine, and $a$ $a'$ the spark-gaps in air or in oil. $P'$ $P^2$ are the earth-plates. This is the well-known apparatus used by Hertz, in which, as shown, for example, in Fig. 1, condensers may be interposed between the two pairs of balls. In Fig. 2 the earth-plates are connected with the spark-circuit through the medium of an induction-coil.

Figs. 3 and 4 show condensers joined in cascade, in Fig. 3 with primary coils interposed between the successive condensers, so as to act inductively on the circuit containing the earth-plates $P'$ $P^2$, and in Fig. 4 without any induction-coil.

Fig. 5 shows another arrangement in which two spark-gaps are provided in circuit with the earth-plates, in which the combined action of capacity and induction is used. The evident purpose of this arrangement is to retard the vibrations whose frequency depends in a well-known manner upon the product $\sqrt{L.C}$, in which L signifies the self-induction, C the capacity. Various other arrangements of apparatus may be used.

The collection of the electric disturbances may be effected in the usual manner. Two earth-plates inserted at points of different potential and connected with each other by means of wire will serve for the purpose, a coherer being inserted in its circuit as a delicate receiving element.

A diagrammatical illustration of the manner of carrying out both the transmitting and receiving stations is shown in Fig. 6. R means a Ruhmkorff induction apparatus, with the air-gap $a$. C $C^2$ are the condensers; P' $P^2$, the earth-plates, as mentioned above. All these are parts of the transmitting-station. In the receiving-station P' $P'^2$ are the collecting earth-plates; F, the well-known coherer or the like. M is a Morse apparatus with its battery B and earth-plate $P'^3$. In the moment of action a local circuit will be closed, comprising battery, Morse apparatus, coherer, and earth-plates, as the line coming from the battery is connected to the middle of the coherer. All these connections may be varied in the manner now well known by electricians well up in what has been done already in the line of wireless telegraphy.

The advantages of my improved system are, first, the suppression of aerial wires, with all their attendant evils and inconveniences; second, that the energy expended remaining upon the surface of the conductor it follows that the energy will not be diminished according to the square of the distance, as is the case when radiating freely through the space, but in a much less degree, being limited to surface extension; third, an uneven or a wooded surface will present no obstacle to the transmission.

What I claim, and desire to secure by Letters Patent of the United States, is—

1. The method of transmitting signals electrically from one station to another without the use of connecting-wires, consisting in supplying currents by means of an oscillation-circuit containing a condenser and a spark-gap to earth-plates connected to opposite poles of the transmitting apparatus, and collecting the impulses by earth-plates at the receiving-station connected to opposite poles of the collecting apparatus, substantially as described.

2. The method of transmitting signals electrically from one station to another without the use of connecting-wires, consisting in supplying currents by means of an oscillation-circuit containing a condenser, a spark-gap and an induction-coil to earth-plates connected to opposite poles of the transmitting apparatus, and collecting the impulses by earth-plates at the receiving-station connected to opposite poles of the collecting apparatus, substantially as described.

3. The method of transmitting signals electrically from one station to another without the use of connecting-wires, consisting in supplying currents produced by an oscillation-circuit containing a condenser, a spark-gap and the primary coil of a transformer to earth-plates connected to opposite poles of the secondary coil of said transformer, and collecting the impulses by earth-plates at the receiving-station connected to opposite poles of the collecting apparatus, substantially as described.

In testimony whereof I have hereunto set my hand in presence of two subscribing witnesses.

FERDINAND BRAUN.

Witnesses:
 FRITZ NIESS,
 MAX ADLER.